(12) United States Patent
Gelfenbeyn et al.

(10) Patent No.: US 12,271,934 B2
(45) Date of Patent: *Apr. 8, 2025

(54) ENHANCING FUNCTIONALITIES OF VIRTUAL ASSISTANTS AND DIALOG SYSTEMS VIA PLUGIN MARKETPLACE

(71) Applicant: GOOGLE LLC, Mountain View, CA (US)

(72) Inventors: Ilya Gennadyevich Gelfenbeyn, Sunnyvale, CA (US); Artem Goncharuk, Mountain View, CA (US); Pavel Aleksandrovich Sirotin, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/372,483

(22) Filed: Sep. 25, 2023

(65) Prior Publication Data

US 2024/0013269 A1 Jan. 11, 2024

Related U.S. Application Data

(63) Continuation of application No. 18/094,256, filed on Jan. 6, 2023, now Pat. No. 11,769,184, which is a
(Continued)

(51) Int. Cl.
*G06Q 30/0601* (2023.01)
(52) U.S. Cl.
CPC .............................. *G06Q 30/0601* (2013.01)

(58) Field of Classification Search
CPC ........................... G06Q 30/0601; G06Q 10/10
See application file for complete search history.

(56) References Cited

U.S. PATENT DOCUMENTS

| 6,665,640 | B1 | 12/2003 | Bennett et al. |
| 6,665,650 | B1 | 12/2003 | O'Grady, Jr. et al. |

(Continued)

FOREIGN PATENT DOCUMENTS

| CN | 102668499 | 9/2012 |
| CN | 103119557 | 5/2013 |

(Continued)

OTHER PUBLICATIONS

Intellectual Property India; Examination Report issued in Application No. 202148006382; 7 pages; dated Jan. 10, 2023.
(Continued)

*Primary Examiner* — Cao H Nguyen
(74) *Attorney, Agent, or Firm* — Gray Ice Higdon

(57) ABSTRACT

A method for enhancing dialog systems is disclosed herein. The method may include maintaining an online marketplace that may have a plurality of dialog system extension elements. The plurality of dialog system extension elements may include at least one of a dialog system plugin, a dialog system add-on, a dialog system update, and a dialog system upgrade. The method may further include receiving a selection of one of the plurality of dialog system extension elements from an end user. The end user may be associated with a dialog system. The method may continue with associating the one of the plurality of dialog system extension elements with the dialog system of the end user.

18 Claims, 9 Drawing Sheets

Related U.S. Application Data continuation of application No. 17/521,115, filed on Nov. 8, 2021, now Pat. No. 11,551,273, which is a continuation of application No. 16/424,783, filed on May 29, 2019, now Pat. No. 11,170,415, which is a continuation of application No. 15/166,293, filed on May 27, 2016, now Pat. No. 10,311,492.

(60) Provisional application No. 62/166,686, filed on May 27, 2015.

(56) References Cited

U.S. PATENT DOCUMENTS

| | | | |
|---|---|---|---|
| 7,861,167 | B2 | 12/2010 | Fernando et al. |
| 8,261,231 | B1 | 9/2012 | Hirsch et al. |
| 9,363,372 | B2 | 6/2016 | Wu et al. |
| 10,217,059 | B2 | 2/2019 | Yang et al. |
| 10,311,492 | B2 | 6/2019 | Gelfenbeyn et al. |
| 11,170,415 | B2 | 11/2021 | Gelfenbeyn et al. |
| 11,551,273 | B2 | 1/2023 | Gelfenbeyn et al. |
| 2004/0034860 | A1* | 2/2004 | Fernando .......... G06F 9/46 719/315 |
| 2005/0021689 | A1 | 1/2005 | Marvin et al. |
| 2005/0091057 | A1 | 4/2005 | Phillips et al. |
| 2006/0129979 | A1 | 6/2006 | Fernando et al. |
| 2006/0242077 | A1 | 10/2006 | Dettinger et al. |
| 2007/0180444 | A1 | 8/2007 | Hoover et al. |
| 2007/0201655 | A1 | 8/2007 | Shenfield |
| 2007/0233782 | A1 | 10/2007 | Tali |
| 2008/0139314 | A1 | 6/2008 | Yates et al. |
| 2008/0201701 | A1 | 8/2008 | Hofhansl et al. |
| 2008/0301669 | A1 | 12/2008 | Rao et al. |
| 2009/0210702 | A1* | 8/2009 | Welingkar .......... G06F 8/60 713/168 |
| 2010/0037204 | A1 | 2/2010 | Lin et al. |
| 2010/0262956 | A1 | 10/2010 | Okada |
| 2010/0306689 | A1 | 12/2010 | Jarvenpaa et al. |
| 2011/0023092 | A1 | 1/2011 | Wen et al. |
| 2011/0167405 | A1 | 7/2011 | Min |
| 2011/0302623 | A1 | 12/2011 | Ricci |
| 2011/0321008 | A1 | 12/2011 | Jhoney et al. |
| 2012/0185821 | A1 | 7/2012 | Yaseen et al. |
| 2013/0124700 | A1 | 5/2013 | Miller et al. |
| 2013/0185362 | A1 | 7/2013 | Clagg et al. |
| 2013/0191823 | A1 | 7/2013 | Davidson et al. |
| 2013/0247030 | A1 | 9/2013 | Kay et al. |
| 2014/0047413 | A1 | 2/2014 | Sheive et al. |
| 2014/0053126 | A1 | 2/2014 | Watson et al. |
| 2014/0109073 | A1 | 4/2014 | Fawcett |
| 2014/0129303 | A1 | 5/2014 | Aiglstorfer |
| 2014/0298443 | A1 | 10/2014 | Amaro |
| 2014/0310606 | A1 | 10/2014 | Liu et al. |
| 2014/0337148 | A1 | 11/2014 | Kannan et al. |
| 2015/0033217 | A1 | 1/2015 | Mellor |
| 2015/0039292 | A1* | 2/2015 | Suleman .......... G06F 3/16 704/9 |
| 2015/0135160 | A1 | 5/2015 | Gauvin et al. |
| 2015/0186123 | A1 | 7/2015 | Piunno |
| 2016/0259767 | A1 | 9/2016 | Gelfenbeyn et al. |
| 2017/0185582 | A1 | 6/2017 | Gelfenbeyn et al. |
| 2017/0235559 | A1 | 8/2017 | Saenz et al. |
| 2023/0153876 | A1 | 5/2023 | Gelfenbeyn et al. |

FOREIGN PATENT DOCUMENTS

| | | |
|---|---|---|
| CN | 103246530 | 8/2013 |
| WO | 2008042984 | 4/2008 |

OTHER PUBLICATIONS

Great Britain Intellectual Property Office; Hearing Decision issued in Application No. GB1714456.9; 9 pages; dated Jan. 7, 2022.

Great Britain Intellectual Property Office; Hearing Letter issued for Application No. GB1714456.9 dated Nov. 22, 2021. 12 pages.

Great Britain Intellectual Property Office; Examination Report issued in Application No. GB1714456.9; 7 pages; dated Jul. 8, 2021.

China National Intellectual Property Administration; Notice of Allowance issue in Application No. 201680018980.5; 7 pages; dated May 10, 2021.

Intellectual Property Office of Great Britain; Examination Report issued in Application No. 1714456.9; 5 pages; dated Apr. 30, 2021.

China National Intellectual Property Administration; Notification of Second Office Action issue in Application No. 201680018980.5; 26 pages; dated Sep. 24, 2020.

India Intellectual Property; Examination Report issue in Application No. 201747044774; 8 pages; dated Aug. 18, 2020.

China National Intellectual Property Administration; Notification of First Office Action issue in Application No. 201680018980.5; dated Mar. 18, 2020.

International Search Report and Written Opinion of Ser. No. PCT/US2016/034505; 9 pages; dated Aug. 31, 2016.

India Intellectual Property; Hearing Notice issue in Application No. 201747044774; 2 pages; dated Nov. 23, 2023.

China National Intellectual Property Administration; Notification of Reexamination issue in Application No. 201680018980.5; 21 pages; dated Dec. 13, 2023.

Intellectual Property India; Hearing Notice issued in Application No. 202148006382; 3 pages; dated Jan. 24, 2025.

\* cited by examiner

FIG. 4

NewAgent ≫ Entities ≫ city

Create Entity city

ⓘ Separate synonyms by pressing enter or ; key

| New York | Big Apple | Enter synonym ... | New York, NY, USA |
| Washington | DC | Enter synonym ... | Washington, DC, USA |
| Paris | Enter synonym ... | | Paris |
| Enter synonym ... | | | Enter reference value ... |
| Enter synonym ... | | | Enter reference value ... |

+ Add a row

Save   Save & Close   Cancel

Try it now...

Please use test console above to try a sentence

420 — List of synonyms

410 — Singular reference value/ canonical value for a given entity value

400

ENHANCING FUNCTIONALITIES OF VIRTUAL ASSISTANTS AND DIALOG SYSTEMS VIA PLUGIN MARKETPLACE

BACKGROUND

Currently, dialog systems are widely used in the information technology industry, especially in the form of mobile applications for cell phones and tablet computers. A dialog system can include a computer-based agent having a human-centric interface for accessing, processing, managing, and delivering information. Dialog systems are also known as chat information systems, spoken dialog systems, conversational agents, chatter robots, chatterbots, chatbots, chat agents, digital personal assistants, automated online assistants, and so forth. All these terms are within the scope of the present disclosure and referred to as a "Dialog System" for simplicity.

Traditionally, a dialog system interacts with its users in natural language to simulate an intelligent conversation and provide personalized assistance to the users. For example, a user may generate requests to the dialog system in the form of conversational questions, such as "What is the weather like in Palo Alto?" and receive corresponding answers from the dialog system in the form of audio and/or displayable messages. The users may also provide voice commands to the dialog system requesting the performance of certain functions, including, for example, generating e-mails, making phone calls, searching particular information, acquiring data, navigating, requesting notifications or reminders, and so forth. These and other functionalities make dialog systems very popular as the dialog systems may be of great help, especially for holders of portable electronic devices such as smart phones, cellular phones, tablet computers, gaming consoles, and the like.

Although the demand for dialog systems for third party mobile applications and web services has been growing, it is not an easy task to create a well-operating dialog system. Each dialog system may have a dialog system interface and dialog system engine. The dialog system interface may be responsible for receiving user inputs and delivering dialog system responses to the user. The dialog system engine may be responsible for transforming voice user inputs into text inputs, interpreting text inputs, and generating corresponding responses to text inputs. The process running on the dialog system engine is also known as "natural language processing" (NLP). Development of NLP models is not only very time consuming, but is also a highly technical task. Accordingly, currently existing dialog systems may be very different in their capabilities. For example, a dialog system can properly work for generating emails and search information on the Internet, but the dialog system may not be properly configured to handle user requests related to scheduling events or booking hotel rooms. Additionally, some dialog systems may well handle booking requests, but may be not able to address generating email requests by end users. Therefore, many end users may want to extend functionalities of the dialog systems with which they work.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided is a system for enhancing functionalities of dialog systems. The system may include at least one processor and a memory. The memory may be operable to maintain an online marketplace that may comprise a plurality of dialog system extension elements. The plurality of dialog system extension elements may include at least one of a dialog system plugin, a dialog system add-on, a dialog system update, and a dialog system upgrade. The processor may be operable to receive a selection of one of the plurality of dialog system extension elements from an end user. The end user may have a dialog system associated with the end user. The processor may be further operable to associate the one of the plurality of dialog system extension elements selected by the end user with the dialog system of the end user.

Provided is a method for enhancing functionalities of dialog systems. The method may include maintaining an online marketplace that may comprise a plurality of dialog system extension elements. The plurality of dialog system extension elements may include at least one of a dialog system plugin, a dialog system add-on, a dialog system update, and a dialog system upgrade. The method may further include receiving a selection of one of the plurality of dialog system extension elements from an end user. The end user may be associated with a dialog system. The method may continue with associating the one of the plurality of dialog system extension elements selected by the end user with the dialog system of the end user.

Additional objects, advantages, and novel features will be set forth in part in the detailed description, which follows, and in part will become apparent to those skilled in the art upon examination of the following detailed description and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and, in which:

FIG. 4 shows a Graphical User Interface (GUI) for creating a dialog system entity, in accordance with an example embodiment.

DETAILED DESCRIPTION

Figure 1:
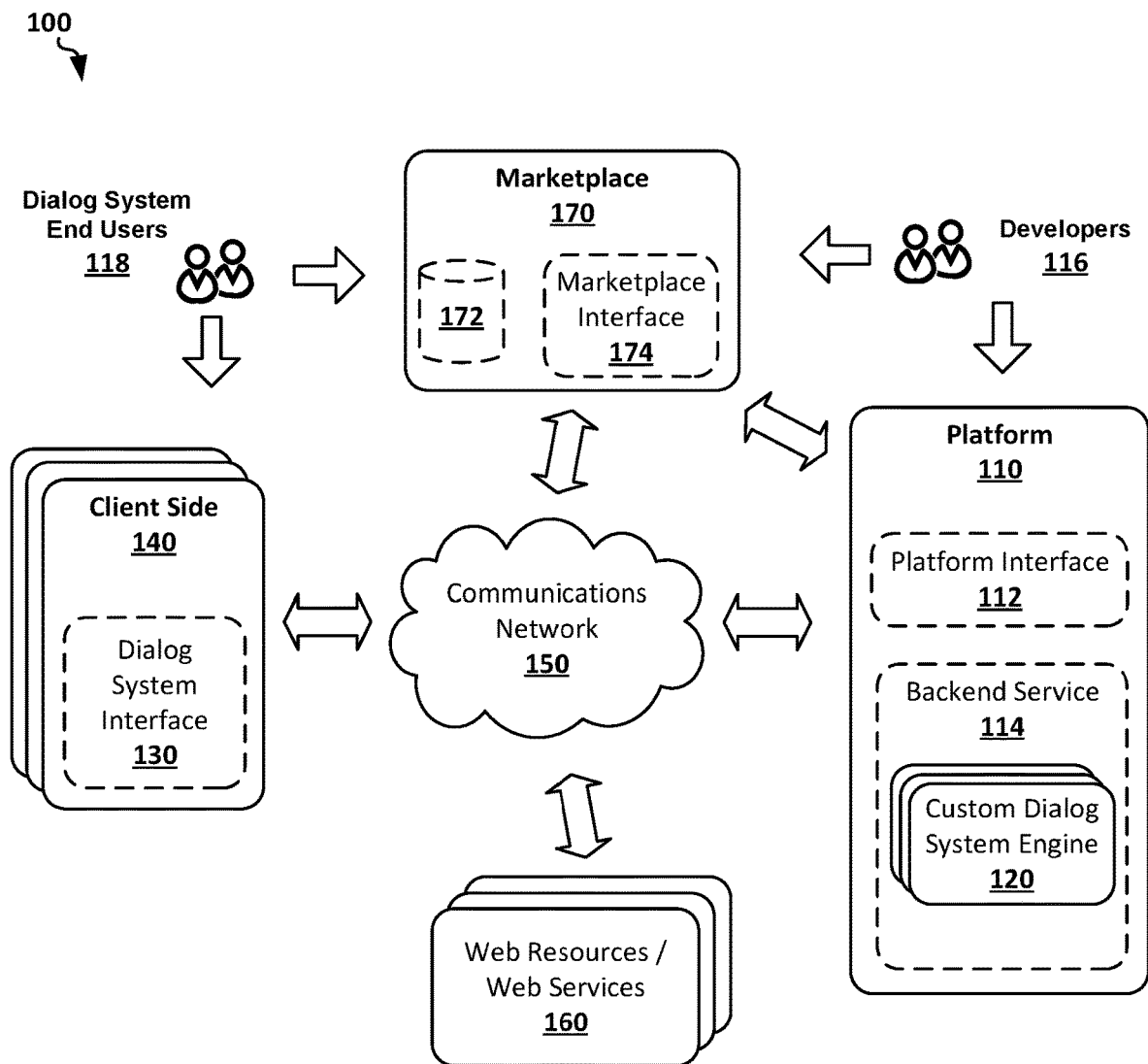
FIG. 1 illustrates an environment within which systems and methods for enhancing functionalities of dialog systems can be implemented, in accordance with some embodiments.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter.

The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Present teachings may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a transitory or non-transitory storage medium such as a disk drive or computer-readable medium. It should be noted that methods disclosed herein can be implemented by a computer (e.g., a desktop computer, a tablet computer, a laptop computer), a game console, a handheld gaming device, a cellular phone, a smart phone, a smart television system, and so forth.

The terms "application developer," "plugin developer," "software developer," or simply "developer" refer to one or more of the following: a software developer, a mobile application developer, a software engineer, a software owner, a mobile application owner, a software manager, a mobile application manager, a dialog system owner, and so forth. Application developers develop and/or manage a Dialog System Engine, a Dialog System Interface, and/or plugins.

The term "Dialog System" refers to one or more of the following: a chat information system, a spoken dialog system, a conversational agent, a chatter robot, a chatterbot, a chatbot, a chat agent, a digital personal assistant, an automated online assistant, etc. Each Dialog System includes a "Dialog System Interface" and "Dialog System Engine." Each of these elements can be customized by an application developer.

The term "Dialog System Interface" refers to a computer-human interface, which is configured to acquire user inputs in the form of audio messages or text messages, and deliver dialog system responses to the users in the form of audio messages or displayable messages. In an example embodiment, a Dialog System Interface may be implemented as a widget employed to or integrated with a software application, a mobile application, a middleware application, a firmware application, a website, and web service, to provide a computer-human interface for acquiring user requests and delivering dialog system outputs to the users.

The term "Dialog System Engine" refers to a software application, which is configured to process user inputs and generates responses thereto. In one example embodiment, a Dialog System Engine refers to a computer-enabled or processor-enabled system for supporting an associated Dialog System Interface by processing user requests and generating corresponding responses thereto.

The term "plugins" refers to one or more of the following: software plugins, add-ons, software extensions, updates, upgrades, or software codes for a Dialog System Engine. The term "plugins" is also referred herein to as "dialog system extension elements."

The present technology provides for a platform for maintaining multiple Dialog System Engines serving as backend services for Dialog System Interfaces. The present technology also provides for an online marketplace, such as the online marketplace implemented as a website or web service, which may include a plurality of dialog system extension elements, including various plugins, add-ons, extensions, updates, or software codes allowing the enhancement of the functionality of Dialog Systems maintained by the platform. For simplicity, "dialog system extension elements" are referred to herein as "plugins." In particular, the platform may maintain one or several Dialog System Engines being core Dialog System Engines and may maintain a plurality of plugins by which functionalities of the core Dialog System Engines may be expanded.

Dialog System Interfaces can be implemented at least as a part of software applications, mobile applications, middleware applications, firmware applications, websites, web services, and so forth. In other words, Dialog System Interfaces may be on a client side and may provide a computer-human interface configured to at least acquire user inputs and deliver dialog system outputs to the end users. Dialog System Engines, on the other hand, may support the Dialog System Interfaces by processing user inputs and generating corresponding responses to the user inputs. Thus, the Dialog System Engine, along with plugins for the Dialog System Engine, and the Dialog System Interface, when interacting with each other, form a Dialog System. One may refer to a Dialog System Interface running on or accessed from a client device as a "frontend" user interface, while a Dialog System Engine, which supports the operation of such Dialog System Interface, can be referred to as a "backend" service.

In general, the online marketplace may maintain dialog system extension elements for customizable Dialog System applications and customizable Dialog Systems. The online marketplace can be a part of a developer online platform for creating customizable Dialog Systems.

The technology of the present disclosure makes it easy and fast for end users to improve and customize Dialog Systems for a wide range of errands and tasks. The end users using Dialog Systems may have the possibility to extend functionalities or capabilities of the Dialog Systems by installing plugins and integrating the plugins into the Dialog Systems. The plugins may be provided when purchased by the end user or on a free-of-charge basis. In one example embodiment, the end users may visit a website or web service associated with the online marketplace and review available plugins and functions of the plugins. Each plugin can be supplemented with metadata, including descriptions, price, terms, publisher's information, ranks, reviews, and so forth. In another example embodiment, the Dialog Systems may allow the end users to install certain plugins when exiting functionalities of the Dialog Systems do not allow the dialog systems to process user requests of the end users in a manner desired by the end users.

Once a plugin is installed, the plugin may at least partially assist the Dialog System Engine in interpreting and processing user requests. In yet more embodiments, the Dialog System Engine may provide recommendations or tips to the end users to install or purchase particular plugins.

More specifically, once a plugin is purchased or selected by a particular end user, the plugin may be automatically integrated with the Dialog System of the end user. Further, all or certain user requests may be processed by the installed plugin, which may ultimately extend or alter functionalities of the Dialog System of the end user in a predetermined manner. For example, default functionalities of the Dialog System may allow searching information on the Internet, but may not allow providing fulfilment responses to user requests. In other words, the Dialog System may be not able to perform certain actions with software or mobile applications, websites, and web services, such as scheduling events in a calendar application or generating emails with the assistance of an email agent. In this example, the end user may purchase a plugin that may extend functionalities of the Dialog System by allowing the Dialog System to make online reservations. The end user may also add another plugin that may extend functionalities of the Dialog System by configuring the Dialog System to interact, for example, with a navigational mobile application. In yet another example, Dialog System functionalities can be extended by adding a plugin that can handle user requests in a foreign language.

In further example embodiments, an end user may install an application from an application store, such as an application store associated with an operating system of a user device, e.g., Android, iOS, Windows Phone, and the like. The operating system of the user device may already have a dialog system. Once the application is downloaded by the user, the dialog system of the user device may be expanded with an application-specific dialog system extension element.

In example embodiments, the dialog system may provide the core functionality (e.g., Amazon Echo) for the user device, for example, when the dialog system is installed together with the operating system of the user device. In other example embodiments, the dialog system may be associated with a dialog interface of only one application installed on the user device.

The present technology may also allow software developers to annotate certain functions to be performed by dialog system extension elements in a source code of software applications in a separate development environment (i.e., without the need to code dialog system functions). The annotations, when invoked, may cause downloading and installing of a dialog system extension element associated with a software application so that a Dialog System Interface may implement desired dialog system functions with respect to certain user inputs and deliver dialog system responses to end users. Annotations may significantly simplify the design process of software applications, thereby allowing the software developers to integrate dialog system extension elements into software applications without dedicating time and resources for developing and maintaining dialog systems having embedded dialog system extension elements.

In accordance with various embodiments of the present disclosure, software developers may insert annotations in the form of metadata within a source code during design time of the Dialog System.

In general, a plurality of end users may use the same Dialog System. The Dialog System may reside in a multi-user environment, for example, on a server, so that the plurality of end users can access the Dialog system. Plugins may be enabled or bought on a per-user basis (i.e., each user may extend the functionalities of the Dialog System by buying plugins and associating the plugins with the Dialog System). The functionalities of the Dialog System provided by the plugins may be available only for the end user who bought the plugins or installed the applications associated with the plugins. Once the Dialog System receives a user request from the end user, the Dialog System may decide whether the user request is to be processed by the Dialog System itself or by any of the enabled plugins.

Plugins can generally be created and provided to the marketplace by developers associated with Dialog Systems or third-party developers. In either case, the plugins can be provided on a free-of-charge basis or when purchased, thereby allowing the developers to generate profit by cooperating with the marketplace.

According to embodiments of the present disclosure, a Dialog System Engine may be linked with a mobile application. The mobile application, in turn, may run on a user device of an end user and may have only a Dialog System Interface, while the Dialog System Engine associated with the Dialog System Interface may reside in a network environment. Therefore, the Dialog System Engine may support the operation of the Dialog System Interface. In this example, the Dialog System Interface can be activated by the end user when the end user interacts with the mobile application. The end user can make inquiries to the Dialog System Interface in the form of voice inputs or text inputs. Upon receipt of a user inquiry, the Dialog System Interface can transfer the user inquiry with little or no pre-processing to the linked custom Dialog System Engine linked to the Dialog System Interface. The Dialog System Engine may process the received user inquiry, interpret the user inquiry, and generate a response to the user inquiry based on predetermined rules and settings. The response may be then delivered to the Dialog System Interface for further visual or audio presentation to the end user. In some embodiments, the response may include a response text to be delivered to the end user and/or metadata with instructions for the end user device to perform (e.g., open a browser, access certain data online, run a particular application, etc.). In other embodiments, the response may include a callback Uniform Resource Identifier (URI) that the Dialog System Interface or user device needs to access to obtain a response text and/or metadata.

In general, Dialog System Interfaces can be integrated or be an integral part of a wide range of software applications running on a client device, such as a personal computer (PC) or a cellular phone, or on a server so that the Dialog Systems become a part of a website or web service. Dialog Systems can be implemented on a server such that their functionalities can be accessible for Dialog System Interfaces over the Internet, cellular networks, or any other communications means. An online marketplace can also be implemented in "a cloud," meaning it can run on a server and be available to software developer thorough a particular website or web interface.

Referring now to the drawings, FIG. 1 shows a high-level block diagram of example system environment 100 suitable for practicing the present technologies. As shown on FIG. 1, a platform 110 for creating and maintaining custom Dialog Systems Engines may be provided. The platform 110 may include a platform interface 112 for creating custom Dialog System Engines 120 and backend service 114 for maintaining and running Dialog System Engines 120.

The platform interface 112 may include a GUI embedded into a webpage and accessible by developers 116 via the Internet. In some other embodiments, however, the platform interface 112 may be implemented as a software application, such as a downloadable software application or any other software, middleware, or firmware running on or accessible from an electronic device such as a computer. In the example shown in FIG. 1, the platform interface 112 may be realized as a web accessible GUI as will be described below. For simplicity, this disclosure describes embodiments where the platform interface 112 is a server-based solution so that it is accessible via the Internet. Regardless of a particular implementation, the platform interface 112 may enable the developers 116 through a number of GUI tools to create one or more custom Dialog System Engines 120.

Still referencing to FIG. 1, the backend service 114 of the platform 110 may be responsible for maintaining and running the custom Dialog System Engines 120 that are created, for example, by or with the help of the platform interface 112. The backend service 114 may operate as a web service providing functionality to custom Dialog Systems by enabling Dialog System Interfaces 130 to interact with the custom Dialog System Engines 120 maintained at the backend service 114 of the platform 110.

As briefly discussed above, the Dialog System Interfaces 130 can be provided on a client side 140 associated with dialog system end users 118. The Dialog System Interfaces 130 may be as simple as a GUI enabling the dialog system end users 118 to make inquiries, which may be then delivered to the backend service 114 for processing by the corresponding Dialog System Engines 120, and to receive responses to the inquires generated by Dialog System Engines 120. The Dialog System Interfaces 130 may be implemented as a stand-alone software application or the Dialog System Interfaces 130 can be an integral part of a software application, mobile application, web service, website, and the like.

Still referencing to FIG. 1, the client side 140 may refer to, but is not limited to, a user device, a terminal, a computing device (e.g., a laptop computer, a tablet computer, a desktop computer, a PC), a cellular phone, a smart phone, a gaming console, a remote control, a multimedia system, a smart television device, a set-top box, an infotainment system, an in-vehicle computing device, an informational kiosk, a robot, and so forth. In these embodiments, the Dialog System Interfaces 130 may be implemented as software, middleware, or firmware installed on such devices.

In additional embodiments, the client side 140 may refer to a networked or online solution, such as a server, hosting service, web service, web site, cloud service, and so forth. For example, the Dialog System Interface 130 can be a widget or a GUI provided on one or more web pages enabling end users to make inquiries and get responses to the inquiries. This option may be suitable for those instances when a developer, for example, wants to integrate a Dialog System into a website of the developer to provide enhanced customer service.

As can be seen in FIG. 1, the interaction between the Dialog System Interfaces 130 and the corresponding Dialog System Engines 120 may be performed via a communications network 150. The communications network 150 may include one or more of the Internet, intranet, cellular network, Local Area Network (LAN), Wide Area Network (WAN), IEEE 802.11 based network, and so forth.

FIG. 1 also shows various third party web resources/web services 160 provided via one or more web servers. These third party web resources/web services 160 can provide information of various types to the Dialog System Engines 120 or the Dialog System Interfaces 130 as a part of a response to a user request. For example, the web resources/web services 160 may refer to email services, weather services, navigation services, and the like. Accordingly, if a user makes the inquiry "What is the weather like today?," such information may be automatically acquired by the Dialog System Engine 120 from one or more third party web resources/web services 160 and then integrated into a dialog system response to be delivered to the dialog system end users 118.

Still referring to FIG. 1, the example system environment 100 may include an online plugin marketplace, shown as a marketplace 170, for maintaining a plurality of selectable plugins. The marketplace 170 can be implemented on a server such that it can communicate with plugin developers, dialog system developers, and end users. In some embodiments, however, the marketplace 170 can be integrated with the platform 110.

The marketplace 170 may include a database 172 for storing plugins and respective metadata. The marketplace 170 may also include a marketplace interface 174 for enabling the developers to review, select, purchase, and/or optionally customize selectable plugins. Metadata may accompany each plugin and include content associated therewith. For example, the metadata may include one or more of the following: a description of plugins, example images, example audio messages, tags, developer comments, ranks, publisher information, payment information, statistical information (e.g., a number of downloads/installs), abuse report links/buttons, legal notices, hyperlinks to third party web resources, and so forth.

The marketplace interface 174 may include a GUI embedded into a webpage and accessible by the plugin developers and end users via the Internet. In some other embodiments, however, marketplace interface 174 may be implemented as a software application, such as a downloadable software application, part of the Client Side/Dialog System Interface application or device or any other software, middleware, or firmware running on or accessible from an electronic device such as a computer. In the example shown in FIG. 1, the marketplace interface 174 may be realized as a web accessible GUI. For simplicity, this disclosure describes such embodiments where the marketplace 170 is a server based solution so that it is accessible via the Internet. Regardless of a particular implementation, the marketplace interface 174 may enable the end users, through a number of GUI tools, to select one or more plugins and associate them with their custom Dialog System Engines 120.

As mentioned above, plugins can be provided to end users in exchange for monetary consideration or on a free-of-charge basis. In one example embodiment, end users may need to make a one-time payment or subscribe to a subscription plan requiring regular payments. Accordingly, the marketplace 170 may be enabled to make financial transactions using monetary or non-monetary funds. For example, the marketplace 170 may have a credit card processing agent, an Automated Clearing House agent, and the like. Subscription plans may require payments in the amounts dependent on a number of dialog system users, period during which a plugin is used (e.g., a periodic plan such as a month-to-month subscription plan, yearly plan), number of plugin copies, complexity, number of functions provided by plugin, and so forth.

Some plugins may be provided on a free-of-charge basis. In one example embodiment, plugins can be provided free-of-charge during a predetermined period (e.g., a test period of one month), but then may require a payment. In further example embodiments, plugins may be provided to end users for trial periods. More specifically, a user request of the end user may be processed by a plugin by default, even if the end user has not subscribed, purchased, or installed the plugin. An answer received based on processing by the plugin may be provided to the end user. Such free providing of plugins to the end users may be done for preview purposes or as a teaser or incentive for the end user to buy the plugin. The presentation of the response may be augmented with a text, such as "Results provided by the plugin . . . " or the like with a link to purchase the plugin. In further embodiments, two responses may be provided to the end user, where one response may be obtained based on processing of the user request by the Dialog System without the plugin, and the other response may be obtained based on processing of the user request by the Dialog System using the plugin. When viewing two responses, the end user may compare the results of processing the user request with and without the plugin to decide whether to purchase the plugin.

If plugins are sold from the marketplace 170, the original owner of the plugins may be compensated by the marketplace 170 from the funds collected from the purchasers. For instance, the owners of plugins sold can be compensated as a percentage of the funds collected at the time of purchase.

In order for the end users to purchase plugins through the marketplace 170 and associate the purchase plugins with the Dialog Systems of the end users, the end users may be required to register with the marketplace 170 and create a user profile.

Accordingly, the marketplace 170 can be referred to a multi-user web platform/web service allowing the end users to review, select, and purchase plugins of their interest and integrate the plugins with Dialog System Engines 120 used by the end users.

For illustrative purposes, the process of creating and operating custom Dialog System Engines 120 will now be described with reference to FIGS. 1-3. In particular, the platform interface 112 may provide one or more GUIs having a number of tools enabling developers to develop plugins in order to create and customize one or more dialog system elements, which serve as a basis for a Dialog System Engine 120.

According to various embodiments, dialog system elements may include entities, intents, dialog system trees, and other dialog system data and metadata. Each entity may refer to a number of objects having the same or similar characteristics. In other words, entities may include lists of terms and/or keywords defining objects of one class. In one example embodiment, an entity may refer to a keyword and a set of synonyms of the keyword. In another example embodiment, an entity may refer to a keyword and a set of its definitions. In yet another example embodiment, an entity may refer to a list (e.g., a list of cities, list of names, list of titles, list of brands, list of street names, etc.).

In some embodiments, each entity can have a title. For example, one entity can be titled as "city" and may contain a list of cities such as Alexandria, Arlington, Boston, and so forth. In other embodiments, an entity can be titled as a keyword and can contain synonyms and/or definitions of this keyword. In one example embodiment, the entity called "music" may include the terms of song, singer, singing, musician, and so forth. In another example embodiment, the entity called "artist" may include a list of music bands, music ensembles, or music artists. In another example embodiment, the entity called "Beatles" may include a list of possible synonyms, such as "The Beatles," "Beatles," "Fab Four," "Liverpool Legends," "John Lennon," and so forth. In yet another example embodiment, there can be an entity called "Artist" which may include various artist names, artist name synonyms, music band names, and so forth.

In some embodiments, the Dialog System Engines may include a number of default, pre-configured entities and/or intents. These can include common types of entities or intents related to such concepts as time, date, location, etc. For example, when a developer creates a new Dialog System Engine, it may already have a few entities of common type such as "@System.Date" entity. This entity may cover linguistically constructs related to particular dates and may include the following terms: "today," "tomorrow," "next week," "January 1," "January 1 of next year," "next Monday," "the following Monday," and so forth.

Further, each intent of a Dialog System Rule may include a dialog system interaction scheme, which may provide a particular relation between at least one user request and at least one dialog system linguistic response or fulfilment response. The dialog system interaction scheme can be represented by a rule based on a relationship between a particular action and at least one entity. Actions generally relate to formalized software objects such as JSON (JavaScript Object Notation) objects causing at least one processor to generate linguistic or fulfilment responses associated with at least one entity. Accordingly, each intent can be represented as a logical relation between at least one action and at least one entity object, for example, as follows:

a) [Action] @[Entity]
b) [Action] @[Entities]
c) [Actions] @[Entity]
d) [Actions] @[Entities]
e) Text @[Entity]
f) Text @[Entities]
g) Text @[Entity] Text
h) [Action] Text @[Entity]

The procedures a) through d) mean that a particular Action or several Actions shall be performed by client side 140 and/or Dialog System Interface 130 with respect to a predetermined Entity or several Entities. For example, one intent may be represented as "Play @Artist," where @Artist is a developer-defined entity containing a set of artists. In this example, the intent orders the Custom Dialog System Engine 120 to activate the playback of at least one Beatles song, depending on a context.

The procedures e) through h) mean that particular information in the form of text is provided with respect to a particular Entity. For example, the user request "Create a meeting with John at 1 p.m. tomorrow, please" may be presented as the following pattern: [Action] Text @[sys.date-time] Text. Here, @[sys.date-time] refers to an entity associated with time and date, while the phrase "Create a meeting" refers to a predetermined action to be performed by Dialog System Interface 130 or Custom Dialog System Engine 120 with a certain mobile application, software application, or web service. Element "Text" refers to content and not entity nor intent.

Intents can also have fulfilment capabilities to generate response text, call external services, and the like. Intents can also have child intents to allow simpler definition of dialog trees. Additionally, actions may be used to define what needs to be collected in a dialog session (when the end user provides a user request and the dialog system provides a response to the user request).

As mentioned above, a dialog system rule may cause generation of a linguistic response and/or fulfilment response as an answer to a user request. One example of a linguistic response may include particularized content deliverable as an audio message or displayable message. Fulfilment responses may refer to particular processor-executable instructions for one or more software applications, middleware, firmware, web service, and the like that cause implementation of a particular action. Some examples of fulfilment responses may include scheduling an event in a calendar mobile application, writing and sending a text message or email, searching for content at a web search service, building a route in a navigational software application, and so forth. In certain embodiments, at least some linguistic responses and/or fulfilment responses can be configured by developers. In other embodiments, at least some linguistic responses and/or fulfilment responses can be pre-configured and be available as default responses.

In certain additional embodiments, developers can provide not entities and intents but just example requests to illustrate intents and entities. In these embodiments, the platform 110 may automatically determine, using machine-learning techniques, what entities and intents are implied in example user requests and create corresponding rules. For example, a developer may simply provide example requests, such as "Play Beatles" and "I'd like to listen to Madonna," and the platform 110 may match "Beatles" and "Madonna" to existing entities (system's or user's) and generate corresponding "[Action] @[Entity]" rules automatically.

Thus, developers can use the platform interface 112 to generate a plurality of dialog system rules specific to a particular application or industry. These pluralities of entities and intents form dialog system rules (also referred to as dialog system elements) and enable the custom Dialog System Engines to perform certain actions or generate certain outputs in response to a wide range of end user inputs.

Figure 2:
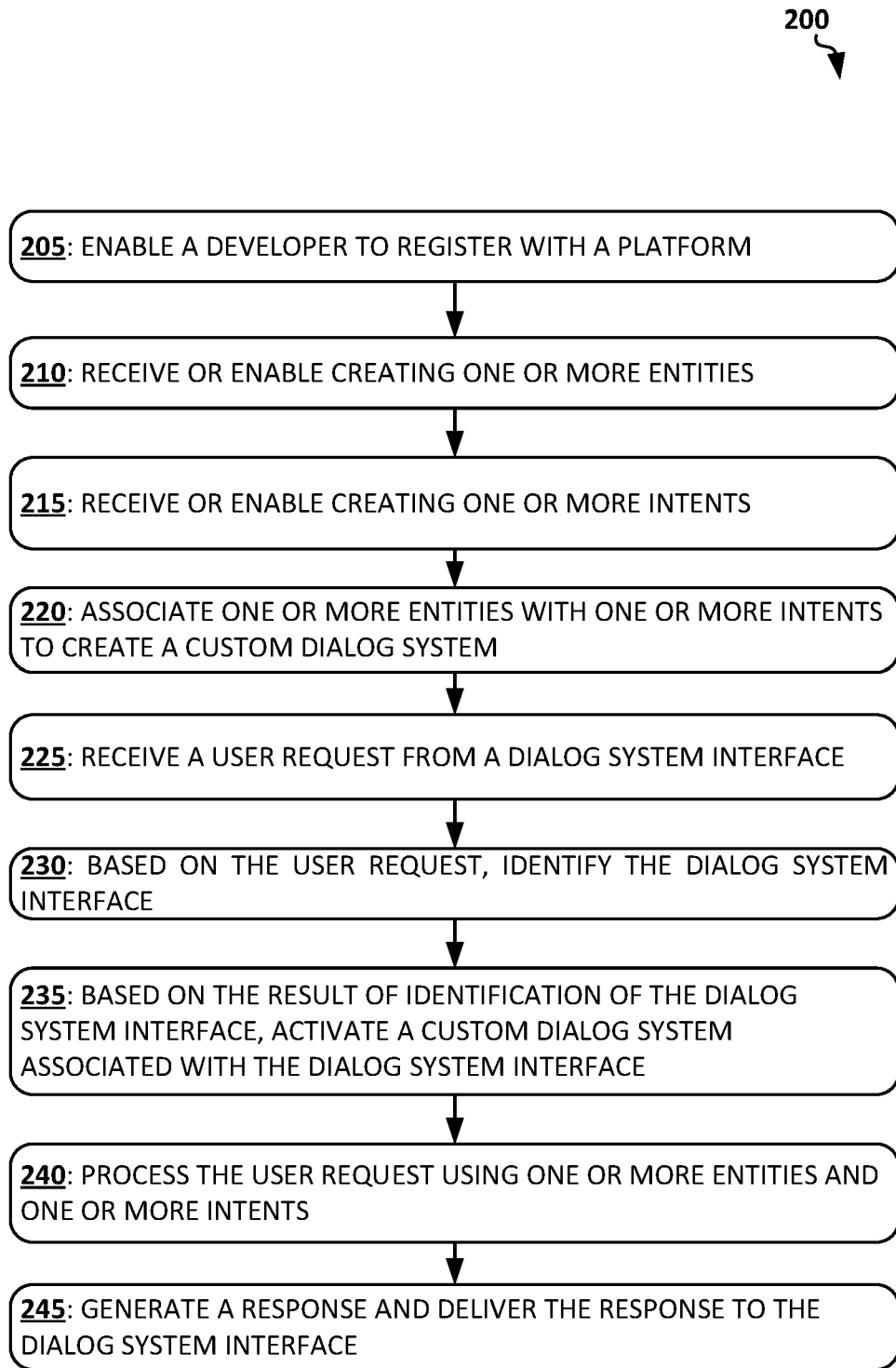
FIG. 2 is a process flow diagram showing a method for creating dialog system engines, in accordance with example embodiments.

FIG. 2 is a process flow diagram showing a method 200 for creating custom Dialog System Engines using a platform shown as the platform 110 on FIG. 1 and for operating the platform according to an example embodiment. The method 200 may be performed by processing logic that may comprise hardware (e.g., decision-making logic, dedicated logic, programmable logic, and microcode), software (such as software run on a general-purpose computer system or a dedicated machine), or a combination of both. In one example embodiment, the processing logic refers to one or more components of the platform. Notably, the below recited steps of the method 200 may be implemented in an order different than described and shown in FIG. 2. Moreover, the method 200 may have additional steps not shown herein, but which can be evident for those skilled in the art from the present disclosure. The method 200 may also have fewer steps than outlined below and shown in FIG. 2.

At operation 205, an application developer may be enabled to register with the platform. To these ends, the developer may need to interact with a platform interface. The registration may include creating a developer profile, which can be maintained by the platform. The developer profile may link (i.e., associate) a custom Dialog System Engine of this developer and one or more Dialog System Interfaces deployed on a client side. The linking may include stipulating Application Programming Codes, rules for interaction, destination addresses, and so forth.

At operation 210, the platform may receive from the developer one or more entities and store the received entities at a local database. In some embodiments, the entities may be not received, but created by the developer using web tools of the platform interface.

At operation 215, the platform may receive from the developer one or more intents and store the intents at the local database. In some embodiments, the intents may be not received, but created by the developer using tools of the platform interface. As described above, the intents may be associated with the entities, and intents and entities together may form dialog system elements (custom rules enabling the Dialog System Engine to generate responses tailored for specific needs).

At operation 220, the platform may associate one or more entities with one or more intents to create (i.e., form) the custom Dialog System Engine. The custom Dialog System Engine may be associated with one or more Dialog System Interfaces of the developer.

Operations 205-220 illustrate a set-up process for the custom Dialog System Engine, while the following operations 225-245 illustrate the operation of a custom Dialog System Engine. Once all dialog system elements of custom Dialog System Engine are created, the dialog system elements may be maintained as a backend service and enable any of the associated Dialog System Interfaces to provide the full functionality of the Dialog System to users according to predetermined settings.

At operation 225, the platform may receive a user request from an unidentified Dialog System Interface. The user request can be a voice input or text input. In some embodiments, the Dialog System Interface can pre-process the user input, for example, by recognizing spoken words and transforming the voice input into text input. In other embodiments, however, no pre-processing is performed by Dialog System Interface 130.

At operation 230, the platform may process the user request and identify the Dialog System Interface and the Dialog System Engine associated with the identified Dialog System Interface. In particular, the user request can be accompanied by an identifier when the user request is sent from the Dialog System Interface to the platform.

At operation 235, based on the result of the identification at operation 230, the platform may activate the custom Dialog System Engine associated with the identified Dialog System Interface. At the same operation, the platform may also retrieve or identify one or more dialog system elements (such as one or more entities, one or more intents, one or more keywords, synonyms of the keywords, definitions of the keywords, reference values, dialog system trees, lists of terms, and the like) based on the result of the identification at operation.

At operation 240, the Dialog System Engine may select the appropriate dialog system elements and process the user request using identified dialog system elements (such as one or more entities, one or more intents, one or more keywords, synonyms of the keywords, definitions of the keywords, reference values, dialog system trees, lists of terms, and the like) as retrieved at operation 235.

At operation 245, the Dialog System Engine may generate a response and send the response to the Dialog System Interface associated with the custom Dialog System Engine 120. The Dialog System Interface may then display and/or playback the response to the end user depending on predetermined settings.

Figure 3:
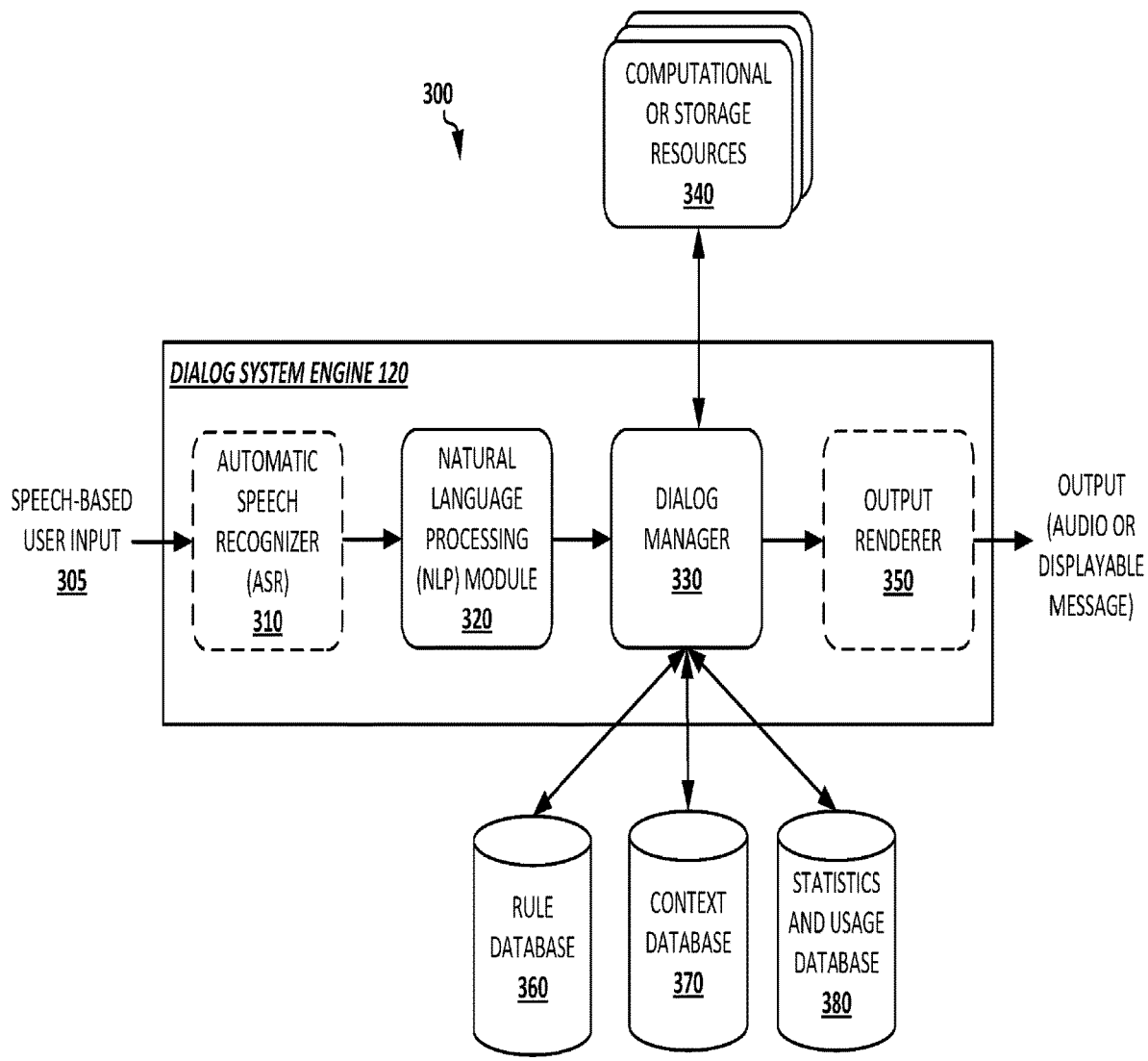
FIG. 3 is a block diagram showing various modules of a dialog system engine, in accordance with example embodiments.

FIG. 3 shows a high-level architecture of exemplary Dialog System Engine 300, according to an example embodiment. It should be noted that each module of the Dialog System Engine 300 or associated architecture includes hardware components, software components, or a combination thereof. The Dialog System Engine 300 may be embedded or installed in a user device or server, or may be presented as a cloud computing module and/or a distributed computing module.

In the embodiment shown, the Dialog System Engine 300 may include an Automatic Speech Recognizer (ASR) 310 configured to receive and process a speech-based user input 305 into a sequence of parameter vectors. The ASR 310 may further convert the sequence of parameter vectors into a recognized input (i.e., a textual input having one or more words, phrases, or sentences). The ASR 310 may include one or more speech recognizers, such as a pattern-based speech recognizer, free-dictation recognizer, address book based recognizer, dynamically created recognizer, and so forth.

Further, the Dialog System Engine 300 may include an NLP module 320 for understanding spoken language input. Specifically, the NLP module 320 may disassemble and parse the recognized input to produce utterances, which are then analyzed utilizing, for example, morphological analysis, part-of-speech tagging, shallow parsing, and the like. The NLP module 320 may then map recognized input or its parts to meaning representations.

The Dialog System Engine 300 may further include a dialog manager 330, which may coordinate the activity of all components, controls dialog flows, and communicates with external applications, devices, services, or resources. The dialog manager 330 may play many roles, which include discourse analysis, knowledge database query, and system action prediction based on the discourse context. In some embodiments, the dialog manager 330 may contact one or more task managers (not shown) that may have knowledge of specific task domains. In some embodiments, the dialog manager 330 may communicate with various computational or storage resources 340, which may include, for example, a content storage, rules database, recommendation database, push notification database, electronic address book, email or text agents, dialog history database, disparate knowledge databases, map database, points of interest database, geographical location determiner, clock, wireless network detector, search engines, social networking websites, blogging websites, news feeds services, and many more. In some embodiments, computational or storage resources 340 may include one or more web resources/web services 160 as shown on FIG. 1 and discussed above.

Referring back to FIG. 3, the dialog manager 330 may employ multiple disparate approaches to generate an output in response to recognized inputs. Some approaches include using statistical analysis, machine-learning algorithms (e.g., neural networks), heuristic analysis, and so forth. The dialog manager 330 may be one of the central components of the Dialog System Engine. The major role of the dialog manager 330 may be to select the correct system actions based on observed evidences and inferred dialog states from the results of the NLP (e.g., dialog act, user goal, and discourse history). In addition, the dialog manager 330 may be able to handle errors when the user input has ASR and NLP errors caused by noises or unexpected inputs.

The Dialog System Engine 300 may further include output renderer 350 for transforming the output 360 of dialog manager 330 into a form suitable for providing to the user. For example, the output renderer 350 may employ a text-to-speech engine or may contact a pre-recorded audio database to generate an audio message corresponding to the output 360 of the dialog manager 330. In certain embodiments, the output renderer 350 may present or cause to present the output 360 of the dialog manager 330 as a text message, an image, or a video message for further displaying on a display screen of the user device. In some example embodiments, the output renderer 350 can constitute at least a part of the Dialog System Interface shown as the Dialog System Interface 130 on FIG. 1.

Still referring to FIG. 3, the Dialog System Engine 300 may include one or more dialog system rules maintained in at least one rule database 360. The Dialog System Engine 300 may also include or be associated with one or more context databases 370, which may maintain a plurality of context description elements, such as lists of terms, keywords, phrases, expressions, context variables, and context parameters (e.g., geolocation, system rate, GUI, etc.) associated with one or more dialog system rules. In other words, the context databases 370 may include information supporting the process of determining conversational or environmental context for particular user requests.

The Dialog System Engine 300 may also include or be associated with one or more statistics and usage databases 380, which may be configured to aggregate statistical or usage information associated with the operation of the Dialog System Engine 300 and/or associated the Dialog System Interface and/or associated mobile or software application. For example, statistics and usage database 380 may accumulate dialog system logs, which can be later used for optimization of dialog system rules, dialog system responding schemes, training machine-learning algorithms if employed by Dialog System Engine, and so forth.

Figure 5:
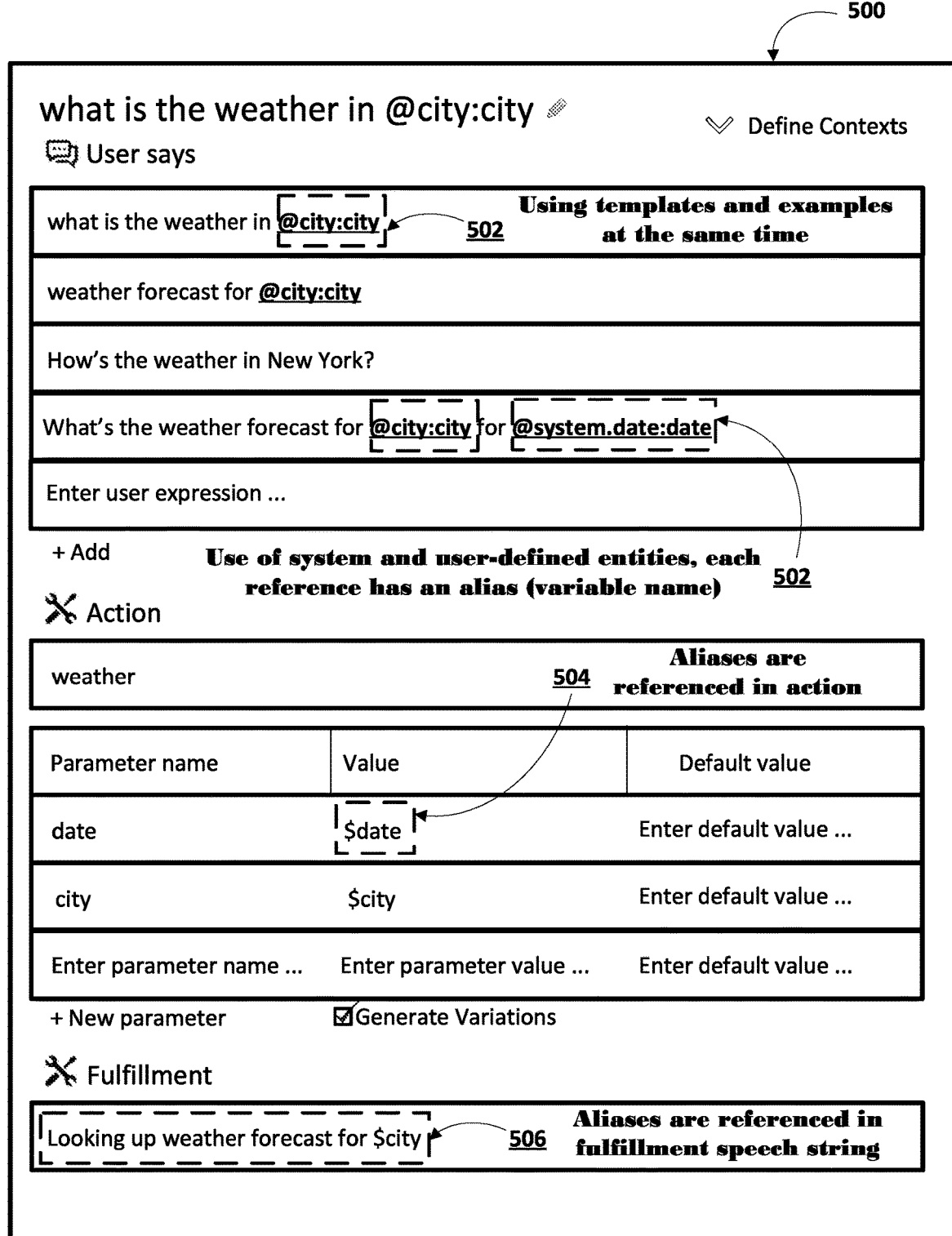
FIG. 5 shows a GUI for creating a dialog system intent, in accordance with an example embodiment.
Figure 6:
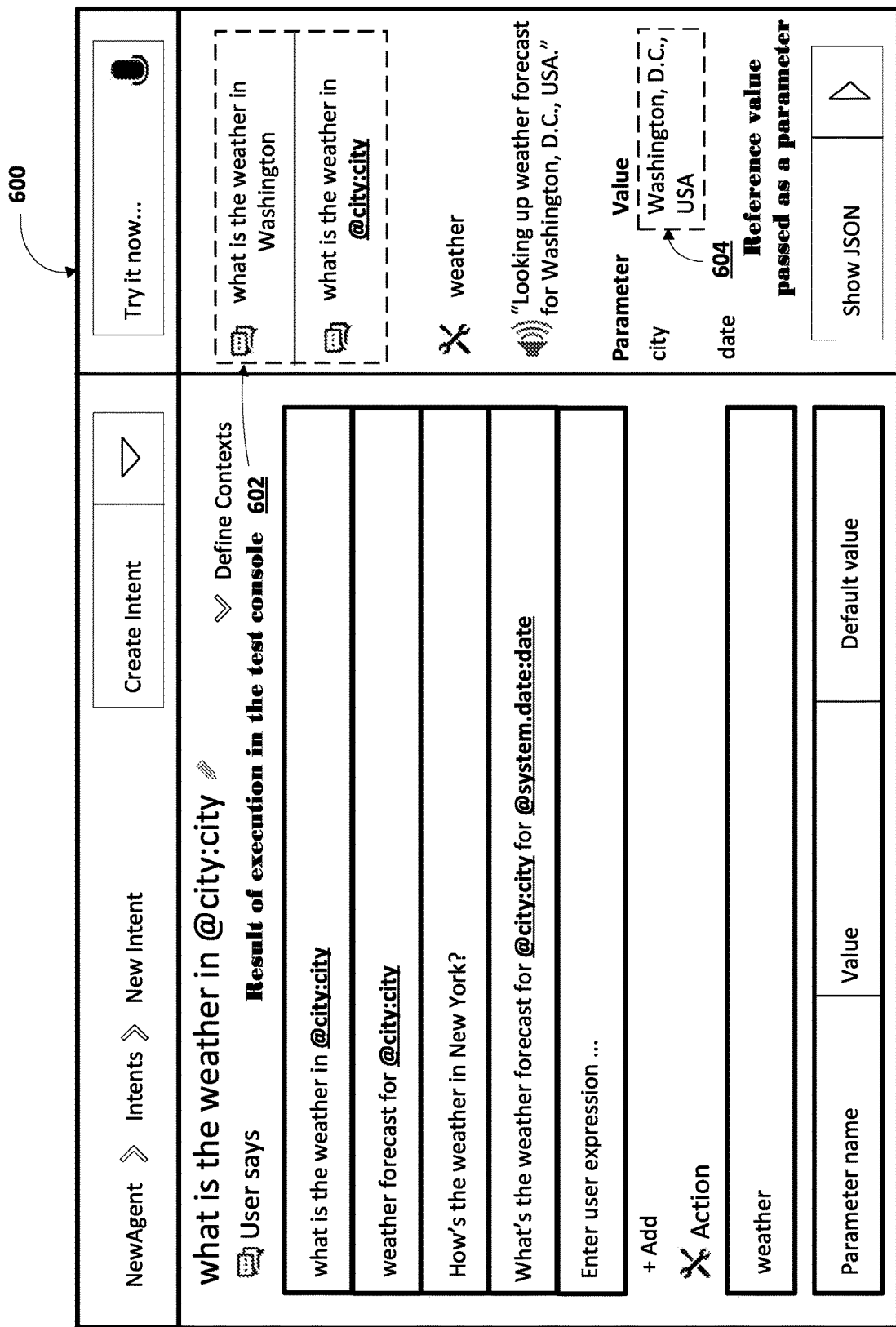
FIG. 6 shows a GUI for creating a dialog system intent, in accordance with an example embodiment.

FIG. 4-6 illustrate various screenshots of a platform interface, which show the process of manually creating entities (see FIG. 4) and manually creating intents (see FIGS. 5 and 6) by developers.

FIG. 4 shows an example GUI 400 of a platform interface for creating a new dialog system entity as discussed above. When the developer desires to create a custom dialog system engine, the developer may define dialog system entities and intents using web tools of the platform interface, such as the GUI 400. Using the GUI 400, the developer can enter reference value 410 (or a canonical value for a given entity value) for a keyword and enter a synonym 420 or a list of synonyms 420 for the provided reference value 410 in the corresponding fields provided by GUI 400. The dialog system entities may include a keyword (or reference value) and synonyms to the keyword, a keyword and definitions of the keyword, a list of keywords defining objects of one class, and so forth. Keywords or reference values with their synonyms and/or definitions may compose a dialog system entity.

FIG. 5 shows an example GUI 500 of a platform interface for creating a new dialog system intent as discussed above. The dialog system intent may define a relation between a user request and a dialog system response and may be associated with a rule based on a relationship between a particular action and an entity. In general, each intent can be represented as the following computer-readable procedure "[Action] @[Entity]" or "[Action] @[Entities]." Using GUI 500, the developer may add user expressions 502 (e.g. "Weather @city") to illustrate intents and entities. Each expression may have an alias (i.e., a variable name). Based on the user expressions 502, the platform may automatically determine, using machine-learning techniques, what entities and intents are implied in example requests and create a corresponding rule. For example, the developer may simply provide example requests, such as "Weather forecast for Los Angeles." The platform may match "Los Angeles" to existing entities (system or user defined) and generate corresponding "[Action]@[Entity]" rules automatically. Additionally or alternatively, the developer may provide an example request where one or more entities are presented explicitly, such as "What is the weather in @say.geo-city: geo-city-us." In example of FIG. 5, "weather" and parameters associated with action 504 (aliases may be referenced in actions) are "geo-city-us" and "geo-city." The developer can further modify the action 504 and provide a fulfillment 506 for the action 504. Aliases may also be references in a speech string of the fulfilment 506.

The created rule may mean that a particular action needs to be performed by a client side with respect to the entity or several entities. For example, one intent may be represented as "looking up forecast for $geo-city-us." In this example, the intent may order the dialog system engine to look for the forecast in Los Angeles.

FIG. 6 shows an example GUI 600 of a platform interface for creating a new dialog system intent. FIG. 6 shows that result 602 of execution of processing the user request may be shown to the developer in a test console. Additionally, a reference value 604 that passed as a parameter may be shown.

Figure 7:
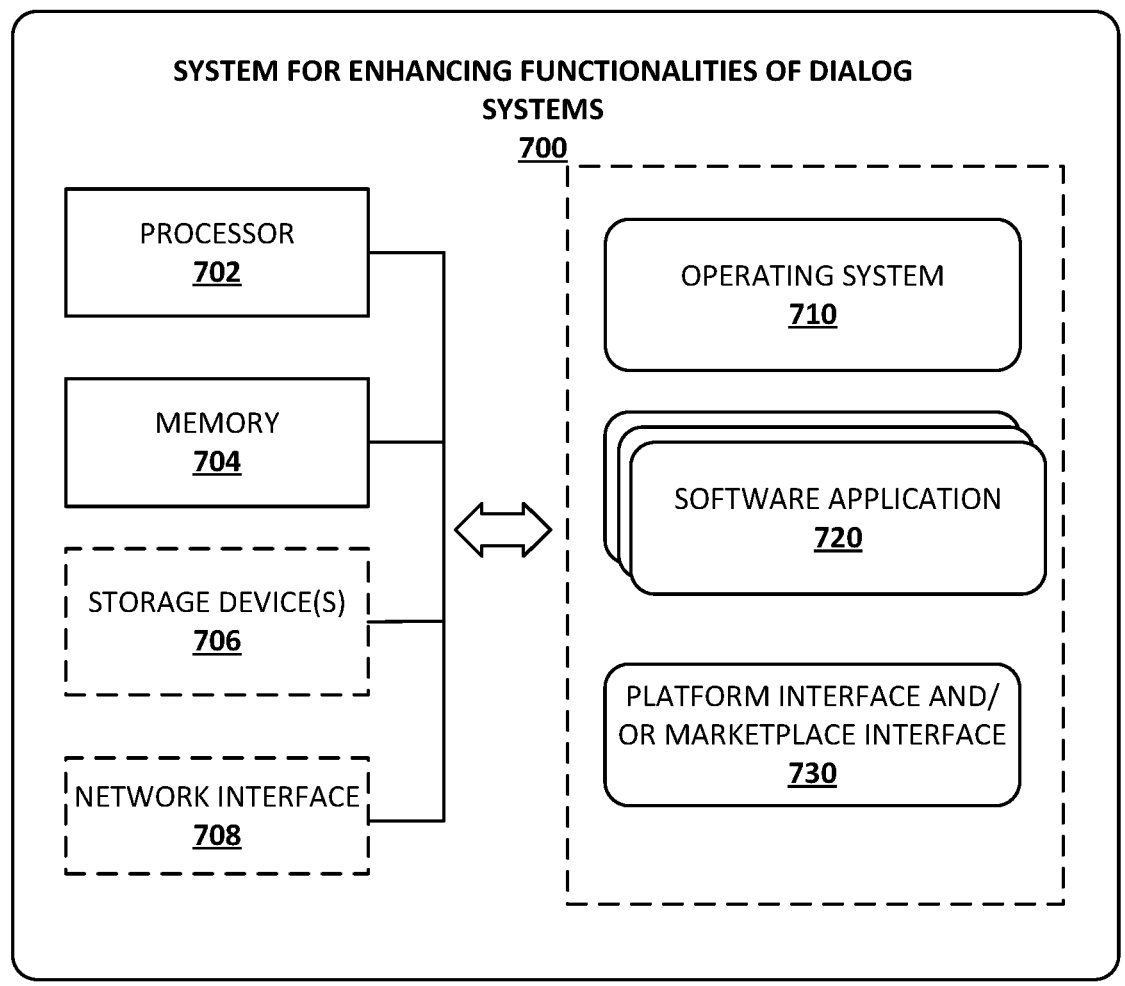
FIG. 7 is a block diagram of a system for enhancing functionalities of dialog systems, in accordance with example embodiments.

FIG. 7 is a high-level block diagram illustrating an example system 700 for enhancing functionalities of dialog systems described herein. In particular, the system 700 may be a server-based solution suitable for running a platform 110 and/or a marketplace 170 shown on FIG. 1.

Note that all components of the system 700 shown on FIG. 7 may include logic elements, hardware components, software (firmware) components, virtual components, or a combination thereof. The system 700 may include, relate, or constitute an integral part of one or more of a variety of types of devices and systems such as a general-purpose computer, server, web server, network service, cloud-computing service, and so forth. Further, all modules shown in FIG. 7 may be operatively coupled using any suitable wired, wireless, radio, electrical, or optical standards.

As shown in FIG. 7, the system 700 includes the following hardware components: at least one processor 702, a memory 704, optionally one or more storage devices 706, and optionally a network interface 708. The system 700 may also optionally include the following software or virtual components: an operating system 710, one or more software applications 720, and an interface 730 (such as a platform interface 112 and/or marketplace interface 174 shown on FIG. 1). The interface 730 may provide a human-centric interface for accessing and managing information as discussed herein.

In some embodiments, the processor 702 may be configured to implement functionality and/or process instructions for execution within the system 700. For example, the processor 702 may process instructions stored in the memory 704 and/or instructions stored on the storage devices 706. Such instructions may include components of the operating system 710, the software applications 720, and/or the interface 730.

The memory 704, according to one example embodiment, may be configured to store information within system 700 during operation. The memory 704, in some example embodiments, may refer to a non-transitory computer-readable storage medium or a computer-readable storage device. In some example embodiments, the memory 704 may be a temporary memory, meaning that a primary purpose of the memory 704 may not be long-term storage. The memory 704 may also refer to a volatile memory, meaning that the memory 704 may not maintain stored contents when the memory 704 is not receiving power. Examples of volatile memories include random access memories (RAM), dynamic random access memories (DRAM), static random access memories (SRAM), and other forms of volatile memories known in the art. In some examples, the memory 704 may be used to store program instructions for execution by the processor 702. The memory 704, in one example embodiment, may be used to temporarily store information during program execution.

One or more storage devices 706 can also include one or more transitory or non-transitory computer-readable storage media and/or computer-readable storage devices. In some embodiments, the storage devices 706 may be configured to store greater amounts of information than the memory 704. The storage devices 706 may further be configured for long-term storage of information. In some examples, the storage devices 706 include non-volatile storage elements. Examples of such non-volatile storage elements include magnetic hard discs, optical discs, solid-state discs, flash memories, forms of electrically programmable memories (EPROM) or electrically erasable and programmable memories (EEPROM), and other forms of non-volatile memories known in the art. In one example, the storage devices 706 can include a database shown as a database 172 on FIG. 1 (i.e., the storage devices 706 can store and maintain multiple dialog system extension elements, which include plugins, add-ons, extensions, etc.). In other embodiments, the storage devices 706 can store and maintain user profiles and custom Dialog System Engines.

Still referencing to FIG. 7, the system 700 may include a network interface 708. The network interface 708 can be utilized to communicate with external devices, servers, and networked systems via one or more communications networks such as one or more wired, wireless, or optical networks including, for example, the Internet, intranet, LAN, WAN, cellular phone networks (e.g. Global System for Mobile (GSM) communications network, packet switching communications network, circuit switching communications network), Bluetooth radio, and an IEEE 802.11-based radio frequency network, among others. The network interface 708 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a Universal Serial Bus.

The operating system 710 may control one or more functionalities of system 700 or components of the system 700. For example, the operating system 710 may interact with the interface 730, and may further facilitate one or more interactions between the software applications 720 and processor 702, memory 704, storage devices 706, and/or network interface 708. The operating system 710 may interact with or be otherwise coupled to the interface 730 and components of the interface 730. Notably, the system 700 and its components may also interact with one or more remote storage or computing resources including, for example, web resources, web sites, social networking websites, blogging websites, news feeds, email servers, web calendars, event databases, ticket aggregators, map databases, points of interest databases, and so forth. Software applications 720, in essence, may provide functionality to the platform and/or the marketplace and enable their operation. Alternatively, the software applications 720 may be additions to the platform and/or the marketplace.

Figure 8:
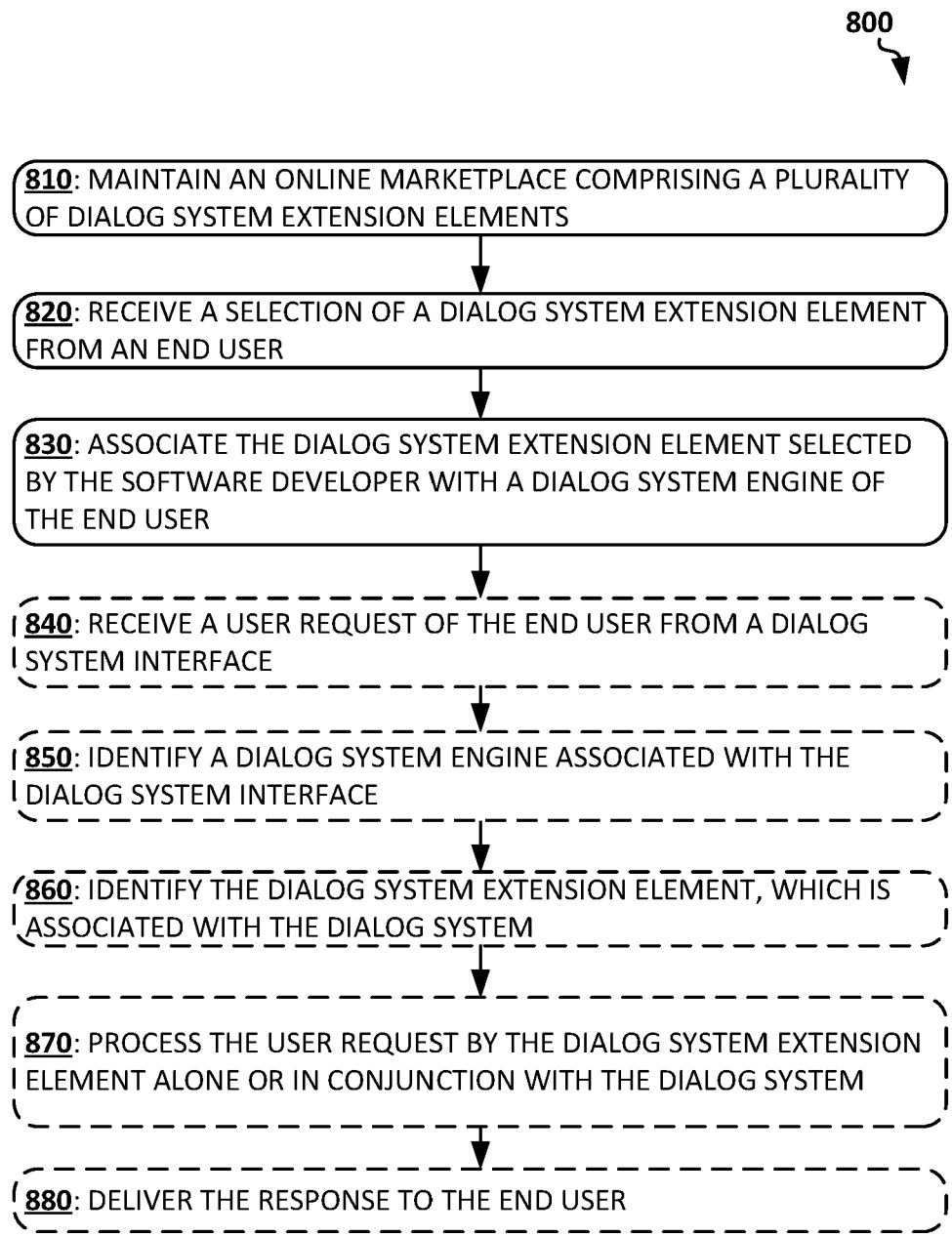
FIG. 8 is a flow chart illustrating a method for enhancing functionalities of dialog systems, in accordance with example embodiments.

FIG. 8 is a process flow diagram showing a method 800 for enhancing functionalities of dialog systems according to an example embodiment. The method 800 may be performed by processing logic that may comprise hardware (e.g., decision-making logic, dedicated logic, programmable logic, and microcode), software (such as software run on a general-purpose computer system or a dedicated machine), or a combination of both. In one example embodiment, the processing logic refers to one or more components of marketplace 170 and/or the platform 110 shown on FIG. 1. Notably, the below recited steps of method 800 may be implemented in an order different than described and shown in FIG. 8. Moreover, the method 800 may have additional steps not shown herein, but which can be evident for those skilled in the art from the present disclosure. The method 800 may also have fewer steps than outlined below and shown in FIG. 8.

The method 800 may commence at operation 810 with maintaining an online marketplace. The online marketplace may be maintained by a memory and may include a plurality of dialog system extension elements (e.g., a dialog system plugin, a dialog system add-on, a dialog system update, a dialog system upgrade, and so forth). End users may view and select (purchase) particular dialog system extension elements through a marketplace interface. The marketplace interface can be available to end users at a website or mobile application associated with a Dialog System (i.e., may be implemented as a dialog system interface). The end users can review metadata associated with dialog system extension elements through the marketplace interface, and comments, ranks, ratings, reviews, publisher's information, description, manuals, images, videos, legal information, and so forth. In some embodiments, the end users may not need to visit the marketplace interface, but may only need to communicate with the Dialog System to learn about certain dialog system extension elements. In yet more embodiments, the Dialog System may monitor interaction between the end user and the dialog system. Furthermore, based on the monitoring, the Dialog System may provide recommendations to the end users to install particular dialog system extension elements in view of historical data of interaction between the end user and the Dialog System associated with the end user. The installing may mean associating the dialog system extension elements with the Dialog System. For example, the end user may request that the Dialog System to provide a particular response. However, existing functionalities of the Dialog System may not allow the Dialog System to process the user request in a manner desired by the end user. In this case, the Dialog System may suggest to the end user that the user request cannot be addressed at this time, unless the end user purchases an additional plugin that is specifically designed to handle such type of user requests. The end user may follow the suggestion of the Dialog System and make a purchase.

More specifically, at operation 820, a processor may receive selection of at least one of the plurality of dialog system extension elements from the end user. The end user may be associated with the Dialog System. In other words, the end user may have a dialog system interface installed on a user device of the end user. Therefore, the selection of the dialog system extension element may be received from the dialog system interface. The dialog system interface may be associated with the dialog system that may be maintained in a network environment (e.g., on a server associated with the online platform). In further example embodiments, the dialog system may be maintained at the user device. The selection of the dialog system extension element may be made by the end user based on one or more of the following: a dialog state, user preferences, dialog system heuristics, a connectivity state, a dialog system state, ranking of each of the plurality of dialog system extension elements in the online marketplace, settings set by the end user, weights assigned to each of the plurality of dialog system extension elements, a type of user request supported by the one of the plurality of dialog system extension elements, and so forth.

In some example embodiments, the selection of the dialog system extension element may include activating one or more annotations. The annotations may be embedded into a software application installed on a user device. More specifically, the annotations may include a code within the software application. The annotations may be associated with the dialog system extension element. When the annotations are activated, i.e. when the code associated with the annotations is invoked, the associating of the dialog system extension elements with the dialog system may be initiated.

In a further example embodiment, the dialog system extension elements may be identified automatically by the Dialog System based on software applications installed on the user device or on the online platform, or based on other factors, such as a status of the user device, a geographical location of the user device, such as a Global Positioning System data associated with the user device, and other personal and contextual information concerning the user and the user device.

In a further example embodiment, the dialog system may be associated with a virtual assistant. The virtual assistant may be at least partially installed on a user device associated with the end user (i.e., the virtual assistant may be installed either on the user device or on the online platform, while a GUI associated with the virtual assistant may be running on the user device for both types of installation of the virtual assistant).

In some embodiments, the selection may require making a financial transaction so that the plugin can be integrated with a particular Dialog System Engine associated with the end user. In these cases, the end user may need to subscribe to a subscription plan or make a lump sum payment for the right to use the selected plugin. More specifically, upon receiving the selection of the dialog system extension element, the processor may receive, from the end user, the selection of the subscription plan associated with the dialog system extension element. Furthermore, the processor may receive a payment for the dialog system extension element. The payment may be provided by the end user in accordance with the subscription plan.

At operation 830, the processor may associate the dialog system extension element selected (and purchased) by the end user with the Dialog System. In particular, the processor may need to identify the end user and/or the Dialog System associated with the end user. The authorization can be accomplished by an authorization process (i.e., requesting that the end user login to the marketplace). More specifically, the processor may receive an authorization request from the end user. The authorization request may include at least authorization data associated with the end user. Based on the authorization data, the processor may communicate with the platform and access the records associated with the end user and the dialog system, such as records associated with a user profile of the end user, with the records being stored in the memory. Based on the records, the end user and the dialog system associated with the end user may be identified. Based on the identification, the processor may authorize an access of the end user to the online marketplace. Once the end user and/or the Dialog System is/are identified, the processor may proceed to linking the Dialog System with the dialog system extension element selected by the end user. In an example embodiment, the linking process may mean that the dialog system extension element is integrated or embedded into the Dialog System or, alternatively, certain links or metadata are integrated with the Dialog System. In a further example embodiment, each of the plurality of dialog system extension elements may be associated with metadata, which may be provided for a review to the end user. In this embodiment, the association of the dialog system extension element with the dialog system may include integrating the metadata associated with the dialog system extension element into the dialog system. In either case, the dialog system extension element may operate in conjunction with the Dialog System.

Further, when the dialog system extension element is successfully associated with the Dialog System, the operation of the Dialog System can be as follows. At operation 840, the processor may receive a user request of a user from a Dialog System Interface. In example embodiments, the dialog system interface may be installed on a user device or a third party server. The dialog system interface may associate with the dialog system maintained at the online platform. At operation 850, the processor may identify the Dialog System Engine associated with Dialog System Interface and/or the end user. At operation 860, the processor may identify the dialog system extension element or several dialog system extension elements, which are associated with the Dialog System Engine and are associated with user preferences that match the user request. At operation 870, the user request may be processed by the dialog system extension element alone or in conjunction with the Dialog System to generate a response or a fulfilment action to the user request. In some embodiments, the Dialog System Engine may attempt to process the user request without any dialog system extension elements. More specifically, during the processing, the dialog system may be activated and one or more dialog system entities, one or more dialog system intents, one or more keywords, synonyms of the keywords, definitions of the keywords, reference values, dialog system trees, lists of terms, and the like may be retrieved. The user request may be processed by applying the one or more dialog system entities and the one or more dialog system intents to generate the response. If the processing of the user request by the dialog system (without the dialog system extension element) is successful, the response is delivered to the user at operation 880 via the Dialog System Interface. If processing of the user request by the dialog system alone is unsuccessful, the user request may be processed using the dialog system extension elements to generate a substitute response to the user request. The substitute response may be delivered to the user. The delivering of the response or the substitute response may include delivering, to the Dialog System Interface or the user device, text, video, audio, and/or metadata, such as a callback URI where the user device can obtain data for delivering to the end user.

In another example embodiment, the Dialog System Engine may process the user request with a dialog system extension element. More specifically, the processor may receive the user request from the dialog system interface. Based on the user request, the processor may identify that the dialog system interface is associated with the dialog system. The processor may further identify at least one dialog system extension element that is associated with the dialog system and applicable for processing the user request. The processor may process the user request using the dialog system extension element to generate a response to the user request. The response may be delivered to the user.

In another example embodiment, the Dialog System Engine may provide responses obtained with and without the dialog system extension element to the end user. More specifically, the processor may receive the user request from the dialog system interface. The processor may identify that the dialog system interface is associated with the dialog system. Based on the user request, the processor may activate the dialog system and process the user request using the dialog system to generate a first response. Furthermore, the processor may identify at least one dialog system extension element on the online marketplace that may be applicable for processing the user request. The processor may further process the user request using the dialog system extension element to generate a second response to the user request. The processor may further cause delivery of the first response and the second response to the end user. The second response may be accompanied with an incentive for the end user to buy the dialog system extension element by which the user request was processed.

Figure 9:
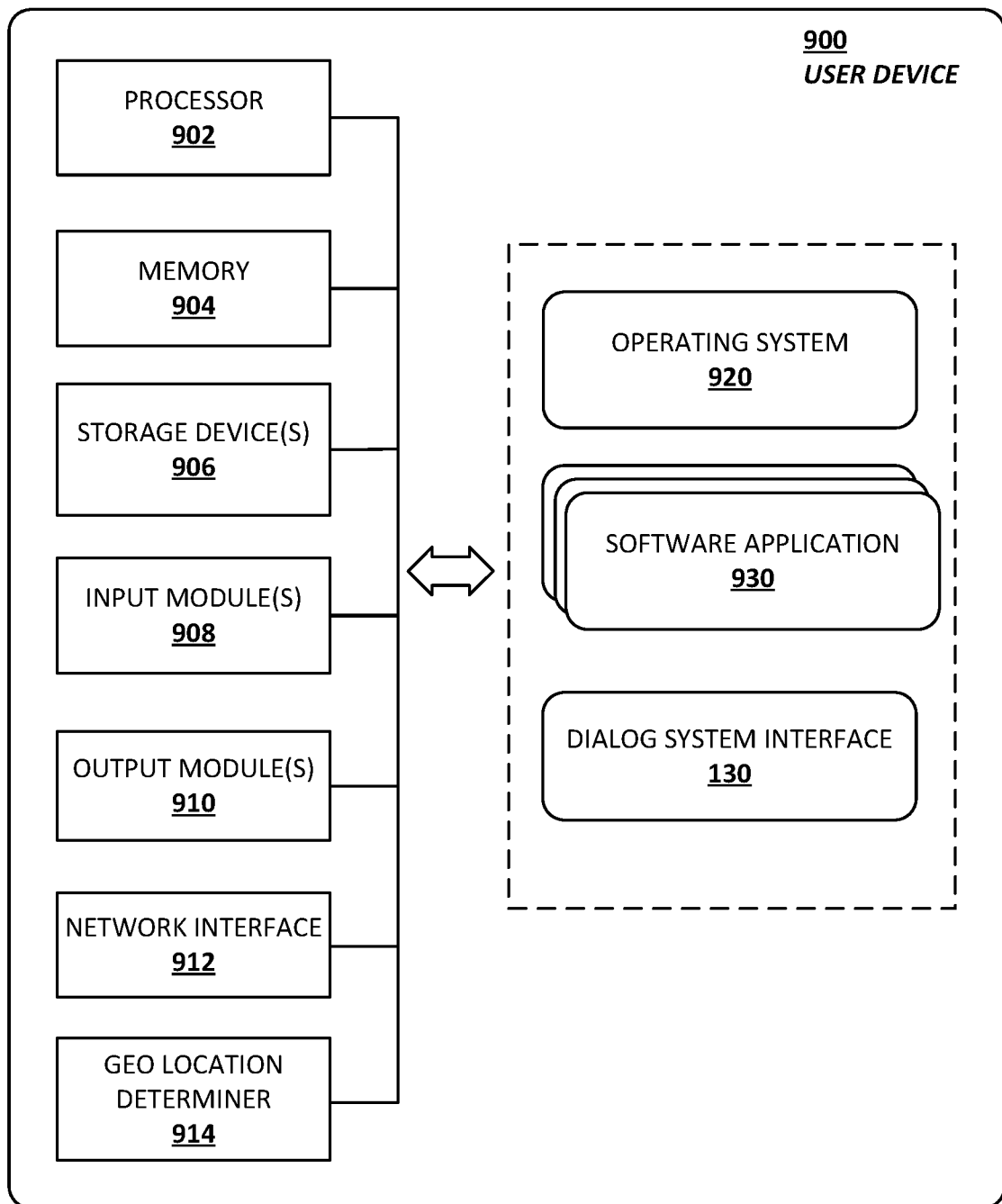
FIG. 9 is a high-level block diagram illustrating an example user device suitable for implementing the methods described herein.

FIG. 9 is a high-level block diagram illustrating an example user device 900 suitable for implementing the methods described herein. It is worth mentioning that all components of the user device 900 may include logic elements, hardware components, software (firmware) components, virtual components, or a combination thereof.

The user device 900 may include at least an integral part of one or more of a variety of types of devices and systems such as a general-purpose computer, desktop computer, server, computer network, network service, cloud-computing service, and so forth. Further, all modules shown in FIG. 9 may be operatively coupled using any suitable wired, wireless, radio, electrical, or optical standards. As already outlined above, the user device 900 may refer to a smart phone, wireless telephone, computer, such as a tablet computer or desktop computer, infotainment system, in-vehicle computing device, and the like.

As shown in FIG. 9, the user device 900 may include the following hardware components: at least one processor 902, a memory 904, one or more storage devices 906, one or more input modules 908, one or more output modules 910, a network interface 912, and a geo location determiner 914. The user device 900 may also include the following software or virtual components: an operating system 920, one or more software (mobile) applications 930, and a dialog system interface 130, which can be a stand-alone software application or be integrated into one or more software applications 930. The dialog system interface 130 may provide a human-centric interface for accessing and managing information as discussed herein, communicating with a dialog system engine, and communicating with web resources/web services. According to various embodiments, the dialog system interface 130 can be virtual.

The processor 902 may be configured to implement functionality and/or process instructions for execution within the user device 900. For example, the processor 902 may process instructions stored in the memory 904 and/or instructions stored on the storage devices 906. Such instructions may include components of the operating system 920 and the software applications 930. The user device 900 may also include one or more additional components not shown in FIG. 9, such as a housing, power supply, communication bus, and the like. These elements are omitted so as to not burden the description of present embodiments.

The memory 904, according to one example embodiment, may be configured to store information within the user device 900 during operation. The memory 904 may refer to a non-transitory computer-readable storage medium or a computer-readable storage device. In some examples, the memory 904 may be a temporary memory, meaning that a primary purpose of the memory 904 may not be long-term storage. The memory 904 may also refer to a volatile memory, meaning that the memory 904 may not maintain stored contents when the memory 904 is not receiving power. Examples of volatile memories include RAM, DRAM, SRAM, and other forms of volatile memories known in the art. In some examples, the memory 904 may be used to store program instructions for execution by the processor 902. The memory 904, in one example embodiment, may be used by software (e.g., the operating system 920) or the dialog system interface 130 executing on the user device 900 to temporarily store information during program execution. The storage devices 906 can also include one or more transitory or non-transitory computer-readable storage media and/or computer-readable storage devices. In some embodiments, the storage devices 906 may be configured to store greater amounts of information than the memory 904. The storage devices 906 may further be configured for long-term storage of information. In some examples, the storage devices 906 may include non-volatile storage elements. Examples of such non-volatile storage elements include magnetic hard discs, optical discs, solid-state discs, flash memories, forms of EPROM or EEPROM, and other forms of non-volatile memories known in the art.

Still referencing to FIG. 9, the user device 900 may include one or more input modules 908. The input modules 908 may be configured to receive user inputs. Examples of the input modules 908 may include a microphone, keyboard, keypad, mouse, trackball, touchscreen, touchpad, or any other device capable of detecting an input from a user or other source in the form of speech, audio, or tactile actions, and relaying the input to the user device 900 or components thereof.

The output modules 910, in some example embodiments, may be configured to provide output to users through visual or auditory channels. The output modules 910 may include a video graphics adapter card, liquid crystal display monitor, light emitting diode monitor, sound card, speaker, or any other device capable of generating output that may be intelligible to a user.

The user device 900, in some embodiments, may include the network interface 912. The network interface 912 can be utilized to communicate with external devices, servers, and networked systems via one or more communications networks such as one or more wired, wireless, or optical networks including, for example, the Internet, intranet, LAN, WAN, cellular phone networks (e.g. GSM communications network, packet switching communications network, circuit switching communications network), Bluetooth radio, and an IEEE 802.11-based radio frequency network, among others. The network interface 912 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a Universal Serial Bus.

The user device 900 may further include the geo location determiner 914 for determining a current geographical location of the user device. The geo location determiner 914 may utilize a number of different methods for determining geographical location including, for example, receiving and processing signals of Global Positioning Systems, GLONASS satellite navigation systems, or the Galileo satellite navigation system; utilizing multilateration of radio signals between radio towers (base stations); or utilizing geolocation methods associated with Internet Protocol addresses, Media Access Control addresses, Radio-Frequency Identification, or other technologies.

The operating system 920 may control one or more functionalities of the user device 900 or its components. For example, the operating system 920 may interact with the dialog system interface 130 and may further facilitate one or more interactions between the software applications 930 and one or more of the processor 902, the memory 904, the storage devices 906, the input modules 908, and the output modules 910. As shown in FIG. 9, the operating system 920 may interact with or be otherwise coupled to the software applications 930, the dialog system interface 130, and components thereof. In some embodiments, the dialog system interface 130 can be included into the operating system 920 and/or the software applications 930. Notably, the user device 900 and its components, such as the dialog system interface 130, may also interact with one or more remote storage or computing resources including, for example, web resources, websites, social networking websites, blogging websites, news feeds, email servers, web calendars, event databases, ticket aggregators, map databases, points of interest databases, and so forth.

Thus, methods and systems for enhancing functionalities of dialog systems by end users have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method performed by one or more processors, the method comprising:
maintaining a plurality of plugins each created by a corresponding developer, wherein the plugins include a given plugin that is created by a given developer of the corresponding developers;
receiving, from an end user, a selection of the given plugin from the plurality of maintained plugins;
in response to receiving the selection:
linking the given plugin with a dialog system that is associated with the end user, wherein the dialog system is associated with a virtual assistant at least partially installed on a user device of the end user;
subsequent to linking the given plugin with the dialog system that is associated with the end user:
receiving a user request from the end user via a dialog system interface of the dialog system that is associated with the end user, wherein the dialog system interface is running on the user device;
identifying the given plugin based on the linking with the dialog system and based on the user request being received via the dialog interface of the dialog system;
processing the user request using the dialog system and without using the given plugin;
determining, based on processing the user request using the dialog system interface and without using the given plugin, to use the given plugin in processing the user request,
wherein determining to use the given plugin is further based on the linking with the dialog system and based on the user request being received via the dialog interface of the dialog system; and
in response to determining to use the dialog extension element in processing the user request:
using the dialog extension element in generating a response to the user request; and
causing the response to be rendered at the user device via the dialog system and responsive to the user request.

2. The method of claim 1, wherein the user request is a speech-based user request and further comprising:
processing the speech-based user request using an automatic speech recognizer to generate recognized text;
wherein processing the user request using the dialog system and without using the dialog extension element comprises processing the recognized text using the dialog system.

3. The method of claim 2, wherein the automatic speech recognizer is a dynamically created recognizer.

4. The method of claim 1, further comprising:
subsequent to linking the given plugin with the dialog system that is associated with the end user:
receiving an additional user request from the end user via the dialog system interface;
identifying the given plugin based on the linking with the dialog system and based on the user request being received via the dialog interface of the dialog system;
processing the additional user request using the dialog system and without using the given plugin;
determining, based on processing the additional user request using the dialog system interface and without using the given plugin, to provide an additional response, to the additional user request, without using the given plugin in processing the additional user request; and
causing the additional response to be rendered at the user device via the dialog system and responsive to the additional user request.

5. The method of claim 1, wherein the response is an audio response.

6. The method of claim 1, wherein the dialog system interface is implemented as a mobile application.

7. The method of claim 1, wherein linking the given plugin with the dialog system comprises:
using authorization data to link the given plugin with the dialog system associated with the end user.

8. The method of claim 7, wherein the authorization data is for an online marketplace at which the plugins are maintained.

9. The method of claim 1, wherein the given plugin is associated with metadata that includes a description of the plugin.

10. A system, comprising:
memory operable to maintain a plurality of plugins each created by a corresponding developer, wherein the plugins include a given plugin that is created by a given developer of the corresponding developers; and
one or more processors operable to:
receive, from an end user, a selection of the given plugin from the plurality of maintained plugins;
in response to receiving the selection:
link the given plugin with a dialog system that is associated with the end user, wherein the dialog system is associated with a virtual assistant at least partially installed on a user device of the end user;
subsequent to linking the given plugin with the dialog system that is associated with the end user:
receive a user request from the end user via a dialog system interface of the dialog system that is associated with the end user, wherein the dialog system interface is running on the user device;
identify the given plugin based on the linking with the dialog system and based on the user request being received via the dialog interface of the dialog system;
process the user request using the dialog system and without using the given plugin;
determine, based on processing the user request using the dialog system interface and without using the given plugin, to use the given plugin in processing the user request,
wherein in determining to use the given plugin one or more of the processors are to determine to use the plugin further based on the linking with the dialog system and based on the user request being received via the dialog interface of the dialog system; and
in response to determining to use the dialog extension element in processing the user request:
use the dialog extension element in generating a response to the user request; and
cause the response to be rendered at the user device via the dialog system and responsive to the user request.

11. The system of claim 10, wherein the user request is a speech-based user request and one or more of the processors are further operable to:
process the speech-based user request using an automatic speech recognizer to generate recognized text;
wherein in processing the user request using the dialog system and without using the dialog extension element one or more of the processors are to process the recognized text using the dialog system.

12. The system of claim 11, wherein the automatic speech recognizer is a dynamically created recognizer.

13. The system of claim 11, one or more of the processors are further operable to:
subsequent to linking the given plugin with the dialog system that is associated with the end user:
receive an additional user request from the end user via the dialog system interface;
identify the given plugin based on the linking with the dialog system and based on the user request being received via the dialog interface of the dialog system;
process the additional user request using the dialog system and without using the given plugin;
determine, based on processing the additional user request using the dialog system interface and without using the given plugin, to provide an additional response, to the additional user request, without using the given plugin in processing the additional user request; and
cause the additional response to be rendered at the user device via the dialog system and responsive to the additional user request.

14. The system of claim 11, wherein the response is an audio response.

15. The system of claim 11, wherein the dialog system interface is implemented as a mobile application.

16. The system of claim 11, wherein in linking the given plugin with the dialog system one or more of the processors are to:
use authorization data to link the given plugin with the dialog system associated with the end user.

17. The system of claim 16, wherein the authorization data is for an online marketplace at which the plugins are maintained.

18. The system of claim 16, wherein the given plugin is associated with metadata that includes a description of the plugin.

* * * * *